No. 734,017.

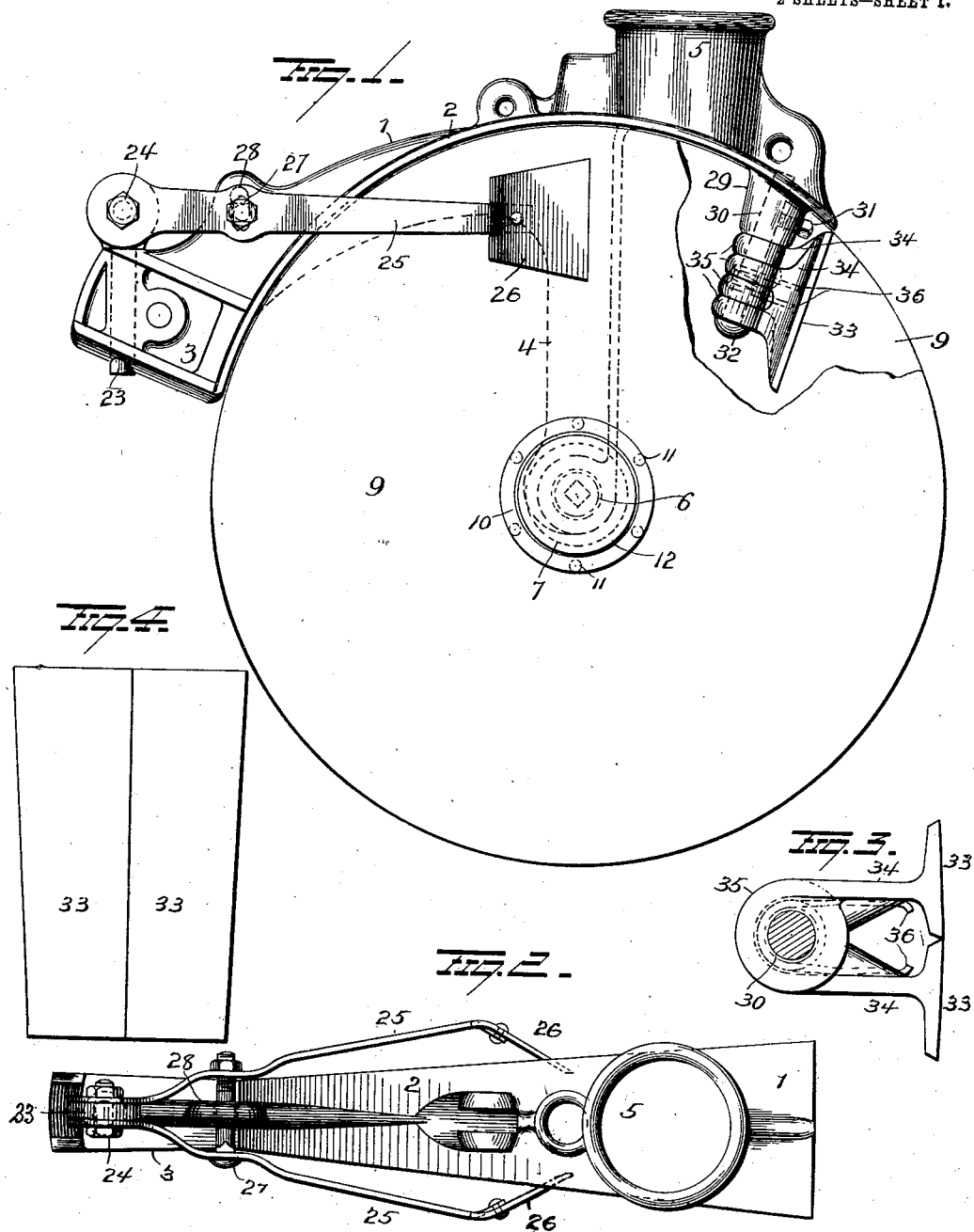

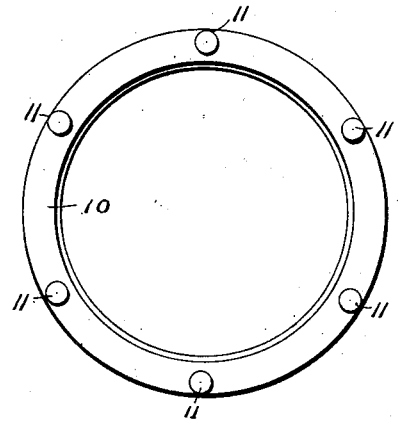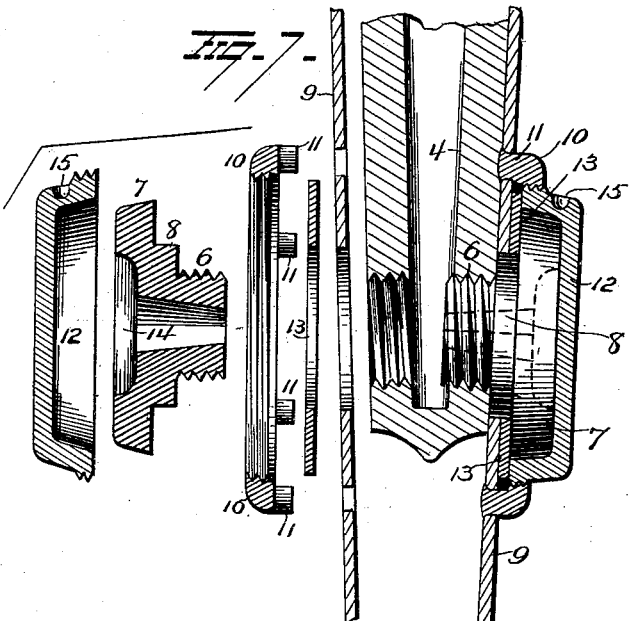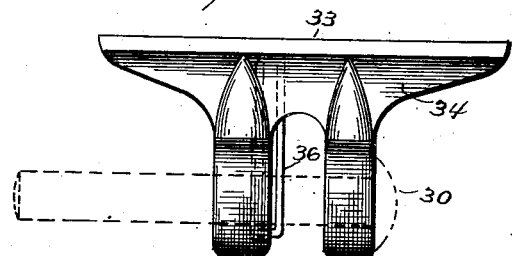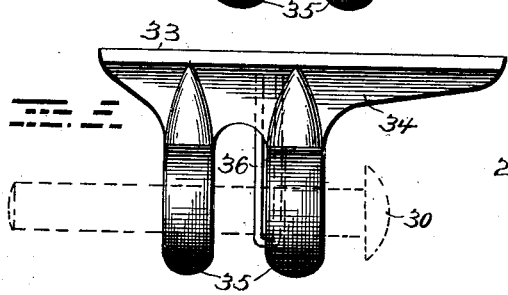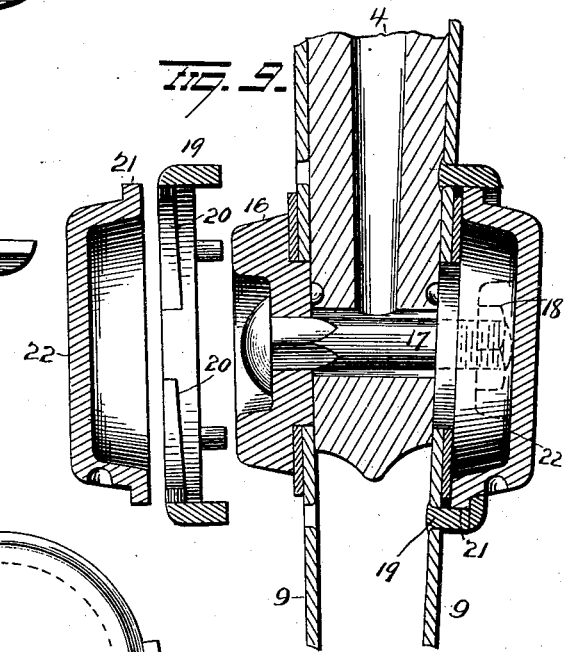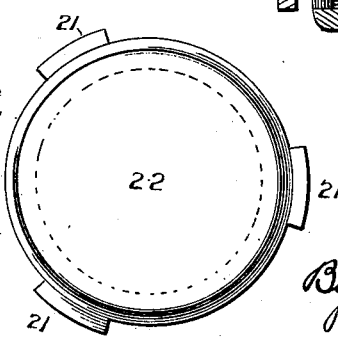

Patented July 21, 1903.

UNITED STATES PATENT OFFICE.

WILLARD A. VAN BRUNT, OF HORICON, WISCONSIN.

DOUBLE-DISK DRILL.

SPECIFICATION forming part of Letters Patent No. 734,017, dated July 21, 1903.

Application filed April 10, 1903. Serial No. 152,052. (No model.)

*To all whom it may concern:*

Be it known that I, WILLARD A. VAN BRUNT, a resident of Horicon, in the county of Dodge and State of Wisconsin, have invented certain new and useful Improvements in Double-Disk Drills; and I do hereby declare the following to be a full, clear, and exact description of the invention, such as will enable others skilled in the art to which it appertains to make and use the same.

My invention relates to improvements in double-disk drills, the object of the invention being to provide improved bearings for the disks and improved scrapers for scraping or cleaning the inner and outer faces of the disks to prevent the accumulation of dirt and trash from interfering with the perfect operation of the drill, and, further, to provide improved bearings for the disks which will permit of ready access to the parts for cleaning them or removing broken or worn parts and their replacement by new parts.

With these objects in view the invention consists in certain novel features of construction and combinations and arrangements of parts, as will be more fully hereinafter described, and pointed out in the claims.

In the accompanying drawings, Figure 1 is a view in side elevation, partly broken away, illustrating my improvements. Fig. 2 is a top plan view. Figs. 3, 4, 5, and 6 are detail views of the inside scrapers. Figs. 7 and 8 are views illustrating the disk-bearings, and Figs. 9 and 10 are similar views of a modified form of bearing.

1 represents the disk-frame, which comprises a curved plate 2, having an enlargement or block 3 at its forward end, a vertical hollow lubricant-conducting standard 4 between its ends, and suitable perforated ears for the attachment of the ordinary drag and lifting bars, and a suitable seed-tube 5 is provided for dropping the seed between the disks.

The standard 4 is provided in opposite sides near its lower end with screw-threaded openings communicating with the lubricant-duct therein, and hollow screw-threaded lugs 6 on bearing-blocks 7 are screwed into said openings, the threads of the lugs being, respectively, right and left, so that the rotation of the disks tends to tighten the bearings in place. The bearing-blocks 7 have contracted journals 8, on which the disks 9 revolve, and my improved bearing-cups are secured to the disks and turn on the blocks, as will now be explained. The cups each comprise two members, one member, 10, being an internally-screw-threaded ring having integral lugs or rivets 11 around its inner edge to enter openings in disk 9 and be upset or securely riveted therein. The other member, 12, is saucer-shaped and externally screw-threaded to screw into member or ring 10 and turn on the block. Washers 13 are preferably placed on blocks 7 between them and the disks to prevent wear of the disks and block, and a lubricant receptacle or pocket 14 is made in each block to receive the lubricant from standard 4 and supply the same to the bearing, and suitable sockets 15 are provided in the removable members 12 to permit the employment of a spanner-wrench to remove or replace them.

In Figs. 9 and 10 I illustrate a modified form of bearing in which the lugs 6 are dispensed with. Alined openings are made in standard 4 for the passage of a headed bolt 17, and bearing-blocks 16 are secured in place by said bolt and a nut 18 on one end thereof. Instead of internally screw-threading the ring 19 I provide the same with internal cam-flanges 20, spaced apart to permit the entrance of lugs or flanges 21 on the removable member or cap 22, so that when the cap 22 is placed in position with its lugs or flanges 21 below cam-flanges 20 and is given a partial turn it will be effectually secured in place. The cam-flanges are so located that the turning of the disks tends to tighten the cap in place.

While I have in both forms of bearing illustrated the removable member as being on the bearing-block, it is to be understood that I do not confine myself thereto, as the member fixed to the disks may form the complete bearing and the removable member be merely a closure therefor.

The block or enlargement 3 at the forward end of the frame 1 has an approximately vertical opening to receive a pin 23, having a flat circular perforated head at its upper end to receive a bolt 24, also passed through openings in the forward ends of spring-arms 25, located on opposite sides of pin 23 and secured thereto by an ordinary nut. These spring-arms 25 bow outward around plate 2, which, it will be observed, projects at both sides beyond the outer face of the disks. The rear ends of arms 25 are bent inward and have plates or scrapers 26 secured thereto and adapted to bear against the outer faces of the disks and effectually clean them. To regulate the tension of the spring-arms, I connect them between their ends by a bolt 27, also passed through an elongated slot 28 in frame 1 to permit pivotal movement of the arms on bolt 24 to dispose the scraper against the edges of plate 2 and hold them out of contact with the disks when working in soil in which the scrapers are not needed or for any other reason it may be desired that the scrapers be idle. This pivotal movement of the arms 25 on bolt 24 also enables the scrapers to be moved nearer to or farther from the edge of the disks, and the rotary support of pin 23 in block 3 compels uniform pressure of the scrapers on both disks.

The rear end of frame 1 has a depending post 29, provided with a socket in which a rod 30 is secured by a set-screw 31, as shown. The lower end of this rod has a head or enlargement 32 and supports my improved inside scrapers 33. These scrapers 33 comprise beveled or inclined plates to engage the inner face of the slightly-inclined disks and are provided with central longitudinal webs 34, having alined bearings 35 to aline with similar bearings on the other member and receive the rod 30 and fulcrum thereon. A spring 36 is coiled between its ends on rod 30 and bears at its free ends against the inner faces of the scrapers to force them outward and maintain them in yielding contact with the disks.

A great many changes might be made in the general form and arrangement of parts described without departing from my invention, and hence I do not confine myself to the precise details set forth, but consider myself at liberty to make such changes and alterations as fairly fall within the spirit and scope of my invention.

Having fully described my invention, what I claim as new, and desire to secure by Letters Patent, is—

1. In a disk drill, the combination with a support, of a bearing-block secured to the support, a disk turning on the block, a ring secured to the disk, internal cam-flanges in the ring, a cap to turn on the block, and external lugs on the cap to engage the cam-flanges and lock the cap in place.

2. In a disk drill, the combination with a support, of a bearing-block, a bolt and nut securing the block to the support, a disk turning on the block, and a bearing-cup comprising two members, one member secured to the disk and the other removably secured to the first-mentioned member, to permit the removal of the block through the first-mentioned member.

3. In a disk drill, the combination with a support, of a bearing-block secured to the support, a disk turning on the block, a ring around the block, lugs on the ring to be upset in holes in the disk, cam-flanges in the ring, a cap, and external lugs thereon to engage the cam-flanges in the ring and removably secure the cap thereto.

4. In a disk drill, the combination with a support, of a bearing-block secured to the support, a disk, a ring secured to the disk, cam-flanges on the ring, a cap to turn on the block and lugs on the cap to engage the cam-flanges of the ring and lock the cap in place.

5. In a disk drill, the combination with a support, of a disk, a bearing-block secured by a bolt and nut to the support and disposed between the disk and the bearing-cup, said bearing-cup comprising two members, one secured to the disk and the other removably secured to the first-mentioned member to permit the removal of the block through the first-mentioned member.

6. In a disk drill, the combination with a support, of bearing-blocks on opposite sides thereof, of disk disposed between the bearing-blocks and the support, a bolt passing through the said blocks and support and secured in place by a nut, and bearing-cups turning on the block, each cup comprising two members removably secured together and one member attached to the disk.

7. In a disk drill, the combination with a support having a lubricant-duct therein, of disks, of bearing-blocks, of a bolt passed through alined openings in the blocks and support, a nut screwed onto the bolt and securing the blocks to opposite sides of the support and sectional bearing-cups secured to the disks and turning on blocks disposed between the disks and the bearing-cups.

8. In a disk drill, the combination with a frame, and disks mounted to turn thereon and disposed at an angle to each other, of a single support projecting into the space between the disks, and scrapers hinged to said support and having inclined wearing edges to engage the inside faces of the disks.

9. In a disk drill, the combination with a frame and disks mounted to turn thereon, of scrapers for the inside of the disks having alined bearings, a single support passing downwardly through said bearings, and a spring between them to hold them in engagement with both disks.

10. In a disk drill, the combination with a frame, and disks mounted thereon, of a depending rod secured to the support, scrapers, comprising inclined plates at right angles to the disks, central webs on the plates and bearings on the webs mounted on said depending rod, and a spring bearing against the scrapers to hold them against the disks with equal pressure.

11. In a disk drill, the combination with a frame, and disks mounted to turn thereon, of a rod depending between the disks and having a head at its lower end, an enlargement on the rear portion of the frame having a socket therein to receive the rod, a set-screw securing the rod in the enlargement, and outwardly spring-pressed scrapers hinged on the rod and adapted to scrape the inner faces of the disks.

In testimony whereof I have signed this specification in the presence of two subscribing witnesses.

WILLARD A. VAN BRUNT.

Witnesses:
F. H. CLAUSEN,
F. P. BIRD.